United States Patent [19]

Möller et al.

[11] Patent Number: 5,498,074

[45] Date of Patent: Mar. 12, 1996

[54] MACHINE FOR KNEADING DOUGH INCLUDING A ROTATABLE CONTAINER AND KNEADING TOOLS ROTATABLE IN THE CONTAINER

[75] Inventors: Dieter Möller, Osnabrück; Konrad Thies, Neuenkirchen; Willi Schmidt, Burgdorf; Daniel Gerbel; Joachim Etzenbach, both of Osnabrück, all of Germany

[73] Assignee: Dierks & Soehne GmbH & Co. KG, Osnabrueck, Germany

[21] Appl. No.: 270,703

[22] Filed: Jul. 5, 1994

[30] Foreign Application Priority Data

Oct. 7, 1993 [DE] Germany .......................... 43 34 121.7

[51] Int. Cl.⁶ .................................. B29B 7/20; B01F 9/16
[52] U.S. Cl. .................................. 366/94; 366/224
[58] Field of Search ........................ 366/56, 64–66, 366/92–95, 224, 298–301; 425/204; 99/348

[56] References Cited

U.S. PATENT DOCUMENTS

| 3,749,373 | 7/1973 | Kemper | 366/92 X |
| 4,176,971 | 12/1979 | Ernster et al. | 366/298 |
| 4,919,539 | 4/1990 | Drocco | 366/94 |

FOREIGN PATENT DOCUMENTS

| 443134 | 9/1912 | France | 366/94 |
| 564513 | 1/1924 | France | 366/94 |
| 820147 | 11/1937 | France | 366/224 |
| 1011542 | 6/1952 | France | 366/94 |
| 1757361 | 4/1971 | Germany . | |
| 3705827 | 9/1988 | Germany | 366/65 |
| 4853 | of 1905 | United Kingdom | 366/95 |

*Primary Examiner*—Charles E. Cooley
*Attorney, Agent, or Firm*—Jordan and Hamburg

[57] ABSTRACT

A machine for kneading dough includes a rotating, driven tub with a flat bottom and a cylindrical tub wall and two kneading tools which engage the tub eccentrically from above and which are rotated in opposite directions, synchronously about axes that are parallel to the axis of the tub and lie in a common plane with the axis. The kneading tools consist of two hoops which have two longitudinal legs which are disposed symmetrically to their axes of rotation, in each case are connected at their ends facing the bottom of the tub by a cross leg, are fastened at their upper ends at a supporting hub and pass through cylindrical working areas which overlap one another regionally, the longitudinal legs being twisted helically relative to the direction of rotation of the hoop formed thereby. The angles of rotation of the cross legs of the hoops are mutually offset. The hoop facing the center of the tub sweeps over the axis of the tub and the working area of the hoop facing the wall of the tub is adjacent to the wall of the tub and has a direction of rotation which is opposite to the direction of rotation of the tub. The diameters of the working areas of the two kneading tools are of a different size.

10 Claims, 3 Drawing Sheets

MACHINE FOR KNEADING DOUGH INCLUDING A ROTATABLE CONTAINER AND KNEADING TOOLS ROTATABLE IN THE CONTAINER

BACKGROUND OF THE INVENTION

In the case of a known machine of this type (German Patent 17 57 361 B2), the kneading tools comprise two equally constructed hoops, the longitudinal axes of which are twisted helically. Due to the two meshing hoops, the dough is subjected to a kneading process, during which a change in direction is impressed on the dough passing through the kneading zone. The dough in the working area of the kneading tools experiences an acceleration and, as a result of folds being formed in opposite directions, is stretched. On leaving the working area, the dough collects in folds that are beaten together and compressed.

SUMMARY OF THE INVENTION

It is an object of the present invention to improve a kneading machine with respect to the efficiency of the mixing and kneading.

An improvement in the efficiency of the kneading machine is achieved by structurally simple means. The difference in the diameters of the two working regions of the two kneading hoops causes a difference in the circumferential speed of the two tools, as a result of which, the dough, on passing through the kneading tools, is exposed to the actions of different forces, which consequently have positive effects on the dough-forming process.

Further details and advantages of the present invention are included in the following description and drawings which illustrate an embodiment of the invention.

DESCRIPTION OF THE PREFERRED EMBODIMENTS

Figure 1:
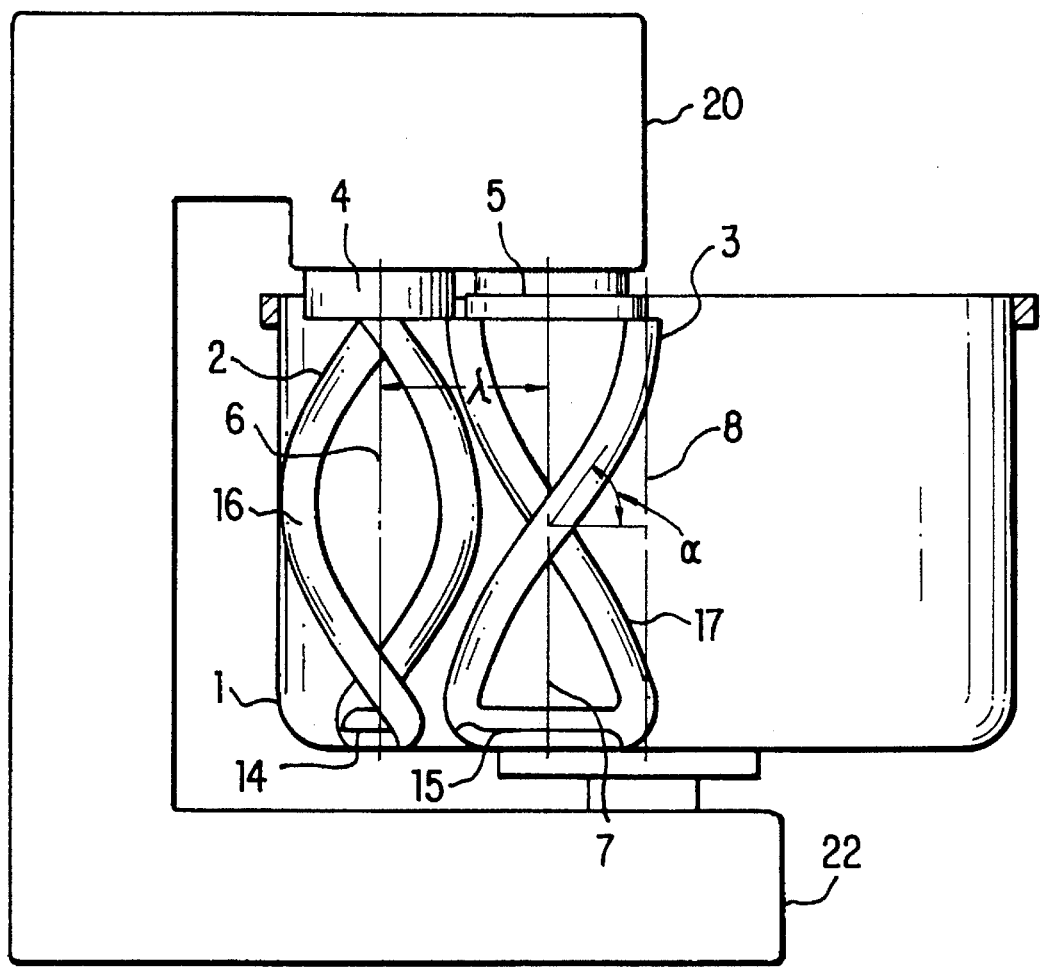
FIG. 1 is a side view of an embodiment of the kneading tub of an inventive kneading machine.

According to FIG. 1, the kneading machine comprises a kneading tub 1 which has a flat bottom and a cylindrical tub wall. Two kneading tools 2, 3, the upper ends of which in each case engage a supporting hub 4, 5, which are rotated by drive means 20 and which extend into the tub 1 from above. The kneading tools 2, 3 rotate about axes 6, 7, which extend parallel to the tub axis 8. The kneading tools 2, 3 rotate in opposite directions, as indicated by the arrows 9,10 in FIG. 2 and 3. The direction of rotation 9 of the kneading tool 2, which is disposed close to the wall of the tub, is opposite to the direction of rotation 11 of the tub 1 which is rotated by drive means 22.

Figure 2:
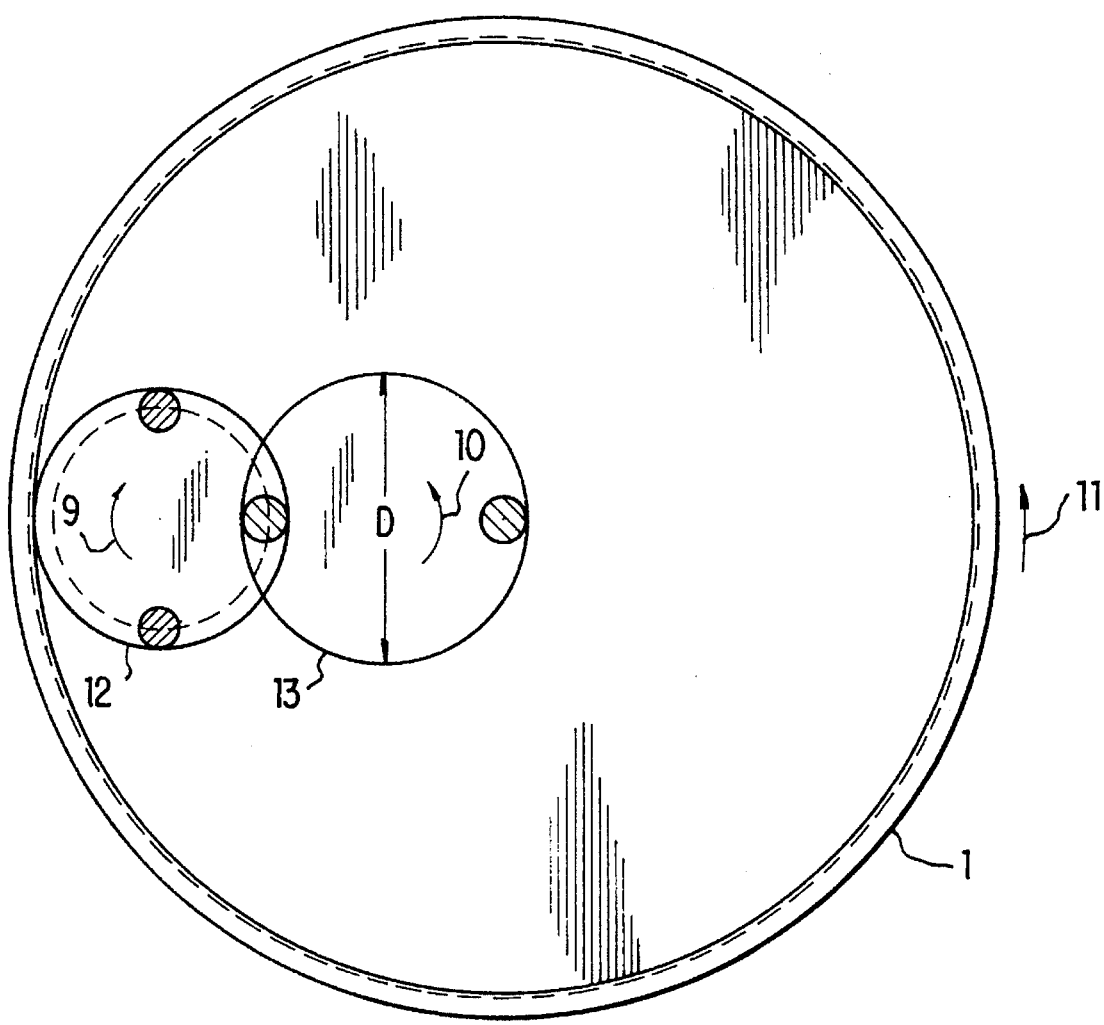
FIG. 2 is a plan view of the kneading tub of FIG. 1.

As can be seen from FIG. 2, the axes of rotation 6, 7 of the kneading tools 2, 3 lie in a common plane with the axis 8 of the tub and eccentrically to the tub 1. The kneading tools 2, 3 are disposed offset to one another, so that the one tool leads or trails the other by 90°. The axes of rotation 6, 7 of the kneading tools 2, 3 and the axis of rotation 8 of the tub 1 are disposed so that the working areas of the kneading tools 2, 3, illustrated by the circles 12 and 13 in FIGS. 2 and 3, mutually cover one another and that the working area 13 of the kneading tool 3 facing the center of the tub sweeps over the tub axis 8. The degree of mutual coverage and the total radial extent of the working areas 12 and 13 can vary within wide limits and is determined in a particular case by optimization points of view on the basis of selected design and operating parameters.

The diameters of the two working areas 12, 13 of the kneading tools 2, 3 are different in size. For the preferred embodiment shown, the working area 13 of the kneading tool 3 facing the tub axis 8 is larger than the working area 12 of the kneading tool 2 facing the tub wall. The diameter of the working circle 13 of the larger kneading tool 3 is about 10% larger than the diameter of the smaller kneading tool 2.

The size of the overlapping area of the two working areas 12, 13 arises from the selected distance A between the axes 6, 7 of the kneading tools. For the example shown, this distance is about 15% to 25% smaller than the diameter D of the working circle of the larger kneading tool 3. Preferred values are of the order of 16% to 20%. Instead of the preferred construction of the kneading tool 3 facing the tub axis 8 as the tool with the larger diameter, the kneading tool 2, which is close to the tub wall, can also, in principle, be provided with the larger diameter. The diameter difference can fall within the range of 5% to 15%.

Each kneading tool 2, 3 can be fashioned in one piece from a rod bent into a hoop or also assembled from several pairs that are welded together. A cast construction of the tool is also possible. It has a straight cross leg 14, 15, which extends parallel to and a little above the bottom of the tub 1. A pair of longitudinal legs. 16, 17, which are fixed to the supporting hub 4, 5, extend from the end of the cross leg 14, 15 to the supporting hub 4, 5. The longitudinal legs 16, 17 are twisted spirally from the cross leg 14, 15 to the supporting hub 4, 5, the twisting being in the same direction as the direction of rotation 9, 10 of the hoops 2, 3 formed by the legs. In this embodiment, the angle of slope $\alpha$ resulting from the twisting is barely 53°.

To carry out the kneading process, the required ingredients, such as flour, water, etc., are added to the tub 1 and the kneading machine is started. Due to the rotation of the tub 1 in conjunction with the rotational movements of the kneading tools 2, 3, the ingredients initially are mixed with formation of a dough, the kneading of which is then completed.

Figure 3:
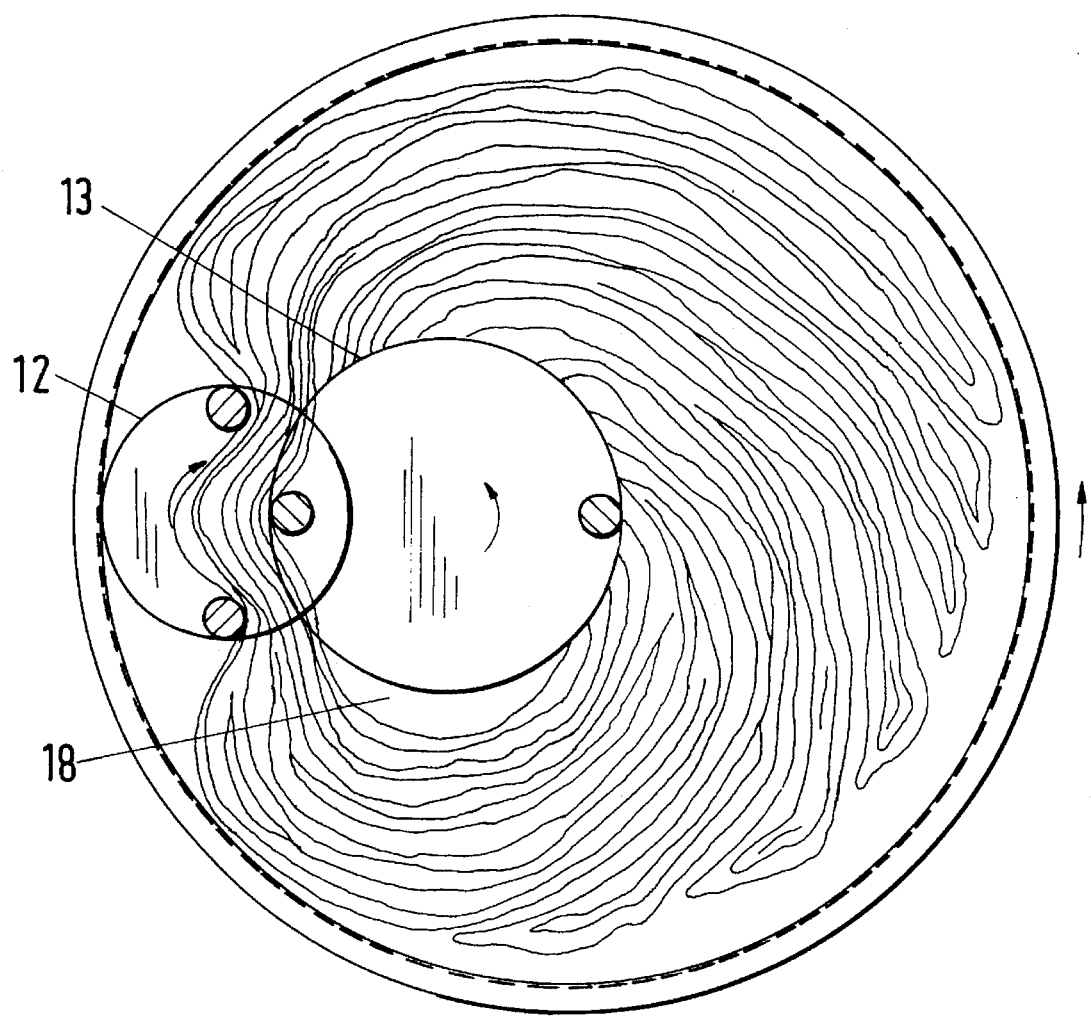
FIG. 3 is a simplified, diagrammatic plan view of the movement of the dough during the kneading process.

The kneading process is illustrated by means of FIG. 3. The enlarged working area 13 of the kneading tool 3 facing the center of the tub, in conjunction with the higher rotational speed, brings about an appreciably more rapid mixing of all the components. Experiments have shown that the mixing phase can be reduced by up to one-third. Since rapid mixing is important for the structure formation of special wheat and rye doughs, the conditions are created for the formation of a qualitatively particularly high-grade dough. In addition, due to the greater working area 13 in the subsequent kneading phase, more dough is transported between the two kneading tools 2, 3. This accelerates the dough-forming process. Moreover, because of the larger working area particularly of tool 3 and because of the simultaneous sweeping over the tub axis 8, smaller batches of dough can also be held longer in the kneading process and therefore be processed more intensively, so that the lower limit for size of dough batches, which can be processed meaningfully, can be lowered appreciably.

Enlarging the working area 13, while keeping the distance between the axes unchanged, results in a larger overlapping area between the two working areas 12, 13, which leads to a very homogeneous mixing of all dough components in the mixing phase. In addition, a lengthening of the guided path is achieved as a result of which there is an additional extension of the dough with positive effects in its structure formation.

Due to the shear forces which arise from the different circumferential speeds, the dough strand emerging from the working region 12, 13 of the kneading tools 2, 3, is deflected by the kneading tool 3, which faces the center of the tub and transported to the wall of the tub. As a result, the compression of the dough is intensified and the dough-forming process accordingly promoted. Moreover, a free space 18 is formed by these means behind the kneading tool 3 facing the center of the tub. By means of this free space, adhesion of the dough to the tool 3 and any climbing of the dough resulting therefrom are counteracted.

In addition thereto, the higher speed of the kneading tool 3 facing the center of the tub brings about an increase in the separating forces between the dough and the tool surface which in turn counteracts any climbing of the dough.

The slight incline of the longitudinal legs 16, 17 of the kneading tools 2, 3 results in a larger vertical component, which contributes, in turn, to a better mixing of all of the components of the dough and, in the subsequent kneading phase, exerts an additional elongation downward on the dough with subsequent compression. The transporting direction, which is directed to the bottom of the tub, also decreases the tendency of the dough to climb.

What we claim is:

1. A dough kneading machine comprising a rotating tub, means for rotating said tub about a tub axis, said rotating tub having a generally flat bottom and a cylindrical side wall, two kneading tools rotatable in said tub, means for rotating said two kneading tools in opposite directions about separate kneading tool axes which are parallel to said tub axis, said kneading tool axes and said tub axis being disposed in a common plane, each of said kneading tools having a pair of longitudinal legs which are symmetrically disposed with respect to the respective kneading tool axis, each of said pairs of longitudinal legs having a bottom and a top, bottom connecting means connecting the bottoms of each respective pair of longitudinal legs, supporting hub means supporting the tops of each respective pair of longitudinal legs, each of said pair of longitudinal legs having a generally helical configuration with the helical configuration of the pair of longitudinal legs of one kneading tool being offset from the helical configuration of the pair of longitudinal legs of the other kneading tool, one of said kneading tools being juxtaposed to said tub cylindrical side wall and the other of said kneading tools being disposed radially inwardly of said one kneading tool, said one kneading tool which is juxtaposed to said tub cylindrical side wall rotating in a direction opposite to the direction of rotation of said tub, each of said kneading tools having a working area diameter determined by the space transcribed by each respective kneading tool as each respective kneading tool rotates, said other kneading tool which is disposed radially inwardly of said one kneading tool being designated an inner kneading tool, said inner kneading tool being disposed in a position in said tub such that when said inner kneading tool rotates, said inner kneading tool overlaps said tub axis, said inner kneading tool having a larger working area diameter than the working area diameter of said one kneading tool juxtaposed to the tub cylindrical side wall, the distance between the kneading tool axes being about 15% to 25% less than the working area diameter of said inner kneading tool.

2. A dough kneading machine according to claim 1 wherein the difference between the working area diameters of each kneading tool is 10% based on the working area diameter of said one kneading tool.

3. A dough kneading machine according to claim 1 wherein said inner kneading tool which is disposed radially inwardly of said one kneading tool has a working area diameter which is 5% to 15% greater than the working area diameter of said one kneading tool which is juxtaposed to said tub cylindrical side wall.

4. A dough kneading machine according to claim 1 wherein the distance between the kneading tool axes is about 16% to 20% less than the working area diameter of the inner kneading tool having the larger working area diameter.

5. A dough kneading machine according to claim 1 wherein each helically configured longitudinal leg of each kneading tool has a slope angle which is less than 53°.

6. A dough kneading machine according to claim 1 wherein said bottom connecting means for each respective pair of longitudinal legs comprises an elongated generally linear connecting cross leg having a longitudinal axis, the longitudinal axes of the connecting cross legs of each respective bottom connecting means being non-parallel.

7. A dough kneading machine according to claim 6 wherein each of said longitudinal legs has a bottom end connected to a respective connecting cross leg.

8. A dough kneading machine according to claim 6 wherein said connecting cross legs are juxtaposed to said flat bottom of said tub.

9. A dough kneading machine according to claim 6 wherein said longitudinal legs are twisted generally spirally upwardly from the respective end of said connecting cross legs.

10. A dough kneading machine comprising a rotating tub, means for rotating said tub about a tub axis, said rotating tub having a generally cylindrical side wall, two kneading tools rotatable in said tub, means for rotating said two kneading tools in opposite directions about separate kneading tool axes which are parallel to said tub axis, each of said kneading tools having a pair of longitudinal legs which are symmetrically disposed with respect to the respective kneading tool axis, each of said pairs of longitudinal legs having a generally helical configuration with the helical configuration of the pair of longitudinal legs of one kneading tool being offset from the helical configuration of the pair of longitudinal legs of the other kneading tool, one of said kneading tools being juxtaposed to said tub cylindrical side wall and the other of said kneading tools being disposed radially inwardly of said tub cylindrical side wall, said one kneading tool which is juxtaposed to said tub cylindrical side wall rotating in a direction opposite to the direction of rotation of said tub, each of said kneading tools having a working area diameter determined by the space transcribed by each respective kneading tool as each respective kneading tool rotates, said other kneading tool which is disposed radially inwardly of said tub cylindrical sidewall being designated an inner kneading tool, said inner kneading tool being disposed in a position in said tub such that when said inner kneading tool rotates, said inner kneading tool overlaps said tub axis, said inner kneading tool having a larger working area diameter than the working area diameter of said one kneading tool juxtaposed to the tub cylindrical side wall, the distance between the kneading tool axes being about 16% to 20% less than the working area diameter of said inner kneading tool.

\* \* \* \* \*